US010924801B2

(12) United States Patent
Yin

(10) Patent No.: US 10,924,801 B2
(45) Date of Patent: Feb. 16, 2021

(54) METHOD AND DEVICE FOR PLAYING MEDIA FILE WHILE SWITCHING RESOLUTION IN WEBPAGE AND STORAGE MEDIUM

(71) Applicant: Beijing Bytedance Network Technology Co., Ltd., Beijing (CN)

(72) Inventor: Guohui Yin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/002,439

(22) Filed: Aug. 25, 2020

(65) Prior Publication Data
US 2020/0396504 A1 Dec. 17, 2020

Related U.S. Application Data

(63) Continuation of application No. PCT/CN2018/103467, filed on Aug. 31, 2018.

(30) Foreign Application Priority Data

May 29, 2018 (CN) .......................... 2018 1 0532424

(51) Int. Cl.
*H04N 21/4402* (2011.01)
*H04N 21/435* (2011.01)
(Continued)

(52) U.S. Cl.
CPC ... *H04N 21/440263* (2013.01); *H04N 21/435* (2013.01); *H04N 21/438* (2013.01);
(Continued)

(58) Field of Classification Search
CPC ......... H04N 21/440263; H04N 21/435; H04N 21/438; H04N 21/4782; H04N 21/8173; H04N 21/84
(Continued)

(56) References Cited

U.S. PATENT DOCUMENTS

2017/0093939 A1 3/2017 Mashiah et al.
2018/0007421 A1* 1/2018 Yoo .................... H04N 21/4622
2019/0124375 A1* 4/2019 Lundberg ............... H04N 21/84

FOREIGN PATENT DOCUMENTS

CN 103517135 A 1/2014
CN 105187896 A 12/2015
(Continued)

OTHER PUBLICATIONS

International Patent Application No. PCT/CN2018/103467; Int'l Search Report; dated Mar. 1, 2019; 2 pages.

*Primary Examiner* — Dominic D Saltarelli
(74) *Attorney, Agent, or Firm* — BakerHostetler

(57) ABSTRACT

The disclosure relates to a method and a device for playing a media file while switching resolution in a webpage and a storage medium, the method includes: receiving a resolution switching event when the player embedded in the webpage plays the original resolution media file; requesting media data in the target resolution media file to be switched to in response to the resolution switching event; wherein the original resolution media file and the target resolution media file adopt a non-streaming media packaging format; constructing a fragmented media file for independent decoding on the basis of the requested media data; sending the fragmented media file to a media element of the webpage through a media source expansion interface of the webpage. The fragmented media file is used for playing the media element in succession with the playing point where the resolution switching event occurs.

20 Claims, 7 Drawing Sheets

(51) Int. Cl.
  *H04N 21/438* (2011.01)
  *H04N 21/4782* (2011.01)
  *H04N 21/81* (2011.01)
  *H04N 21/84* (2011.01)
(52) U.S. Cl.
  CPC ..... *H04N 21/4782* (2013.01); *H04N 21/8173* (2013.01); *H04N 21/84* (2013.01)
(58) Field of Classification Search
  USPC ........................................................ 725/139
  See application file for complete search history.

(56) References Cited

FOREIGN PATENT DOCUMENTS

| CN | 105306969 A | 2/2016 |
| CN | 106131610 A | 11/2016 |
| CN | 106375836 A | 2/2017 |
| CN | 107613029 A | 1/2018 |
| CN | 108055250 A | 5/2018 |
| WO | WO 2017/207861 A1 | 12/2017 |

\* cited by examiner

METHOD AND DEVICE FOR PLAYING MEDIA FILE WHILE SWITCHING RESOLUTION IN WEBPAGE AND STORAGE MEDIUM

CROSS-REFERENCE TO RELATED DISCLOSURES

This disclosure is a continuation of PCT application Ser. No. PCT/CN2018/103467, filed Aug. 31, 2018, which claims the benefit of priority to Chinese Patent with the application number 201810532424.0, filed May 29, 2018. The entire content of this disclosure is hereby incorporated by reference herein.

TECHNICAL FIELD

The disclosure relates to multimedia technology, in particular to a method and a device for playing a media file while switching resolution in a webpage and a storage medium.

BACKGROUND ART

The Moving Picture Experts Group (MPEG)-4 format is a widely used container format for storing video data and audio data coded in various modes.

A player embedded in a browser plays a media file by using a HyperText Markup Language (HTML) 5 media element of the browser, and in a webpage opened by the browser or a webpage of an disclosure program (APP, Disclosure) having an embedded browser kernel; however, the prior art can only support a streaming media file, the player cannot play an MP4 file in a network like processing a streaming media by means of the browser or the APP having an embedded browser kernel while switching resolution, unless format conversion is performed in advance, because the MP4 file itself is not in a streaming media format.

For example, some relevant art, such as FLU (Flash Video) and HyperText Transfer Protocol Live Streaming (HLS), adopts the conversion from an MP4 file to a streaming media format; however, the content service provider would still store the original MP4 file so as to facilitate timely backtracking when problems happen to the streaming media format file in progress; moreover, with the MP4 file and the transcoding file stored parallelly, the storage space occupied by the MP4 file service is multiplied, as a result, the complexity of storage space deployment and streaming media service is remarkably increased.

SUMMARY

In view of this, the disclosure provides a method and a device for playing a media file while switching resolution in a webpage and a storage medium, the object of playing the media file in the non-streaming media format through the webpage is achieved, overcoming the limitation that the non-streaming media packaged format file can only be independently played after being completely downloaded.

The embodiments of the disclosure provide a method for playing a media file while switching resolution in a webpage, comprising: receiving a resolution switching event when a player embedded in the webpage plays a media file with original resolution; requesting media data of a media file with target resolution to be switched in response to the resolution switching event; constructing a fragmented media file for independently decoding based on the requested media data; sending the fragmented media file to a media element of the webpage through a media source expansion interface of the webpage. The media file with original resolution and the media file with target resolution adopt a non-streaming media packaging format. The fragmented media file is used for providing the media element to play in succession with a playing point where the resolution switching event occurs.

The embodiments of the disclosure provide a device for playing a media file while switching resolution in a webpage, comprising: at least one processor; and at least one memory communicatively coupled to the at least one processor and storing instructions that upon execution by the at least one processor cause the device to: receive a resolution switching event when the player embedded in the webpage plays a media file with original resolution; request media data of a media file with target resolution to be switched in response to the resolution switching event; construct a fragmented media file for independently decoding based on the requested media data; send the fragmented media file to the media element of a webpage through the media source expansion interface of the webpage. The fragmented media file is used for providing the media element to play in succession with a playing point where the resolution switching event occurs.

In another aspect, an embodiment of the disclosure further provides a storage medium, where an executable instruction is stored, and when the executable instruction is executed, the storage medium performing operations comprising: receiving a resolution switching event when a player embedded in the webpage plays a media file with original resolution; requesting media data of a media file with target resolution to be switched in response to the resolution switching event; the media file with original resolution and the media file with target resolution adopt a non-streaming media packaging format; constructing a fragmented media file for independently decoding based on the requested media data; and sending the fragmented media file to a media element of the webpage through a media source expansion interface of the webpage; wherein the fragmented media file is used for providing the media element to play in succession with a playing point where the resolution switching event occurs.

The embodiments of the disclosure have the following beneficial effects.

1) By converting media data in a media file in a non-streaming media format into a fragmented media file and sending the fragmented media file to a media element of a webpage for decoding and playing through a media source expansion interface of the webpage, the object of playing the media file in the non-streaming media format through the webpage is achieved, overcoming the limitation that the non-streaming media packaged format file can only be independently played after being completely downloaded.

2) The media data is converted to the segmented media file by the player at the front end, and the media file of different resolution needs to be stored for the background server. The segmented media file does not need to be pre-stored on the server side, and the media file is played in a low storage space.

3) Play by converting media files that do not support streaming playback to segmented media files that support streaming media formats, when the resolution ratio is switched, pictures can be switched seamlessly, a black screen is avoided, realize the smooth play of media files.

DETAILED DESCRIPTION

For the purpose of clarity, objects, technical solutions and advantages of the disclosure will now be described in further detail taken in conjunction with the accompanying drawings, wherein the described embodiments are not to be construed as limiting the disclosure, and all other embodiments which may occur to a person of ordinary skill in the art without involving any inventive effort shall fall within the scope of the disclosure.

Unless otherwise defined, all technical and scientific terms used herein are the same as meanings of general understandings of those skilled in the art of the disclosure. The terms used herein are merely to describe the specific embodiments, not intended to limit the disclosure.

Before the disclosure is further described in detail, the nouns and terms involved in the embodiments of the disclosure are explained, and the nouns and terms involved in the embodiments of the disclosure are applied to the following explanations.

1) Media file, a file storing encoded media data (for example, at least one of audio data and video data) in a container (also called a box), and further comprising metadata to express media information to ensure that media data is correctly decoded.

For example, a media file formed by encapsulating media data in an MPEG (Moving Picture Experts Group)-4 package format is referred to as an MP4 file. Typically, an Advanced Video Coding (AVC or H.264) or MPEG-4 (Part 2) coded video data and an Advanced Audio Coding (AAC) coded audio data are stored in an MP4 file, of course, other encoding methods for video and audio are not excluded.

Figure 1:
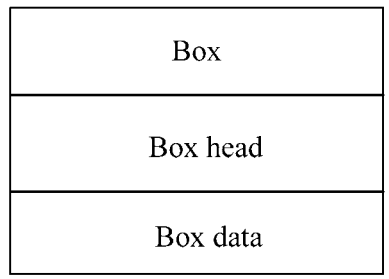
FIG. 1 is a schematic diagram of an optional configuration of a container for multimedia file packaging provided by an embodiment of the disclosure.

2) Container (Box), also called boxes, an object-oriented component defined by a unique type identifier and length. Referring to FIG. 1, an optional structural diagram of a container provided by an embodiment of the disclosure, including a container header (Box Header) and container data (Box Data) filled with binary data for expressing various information.

Figure 2:
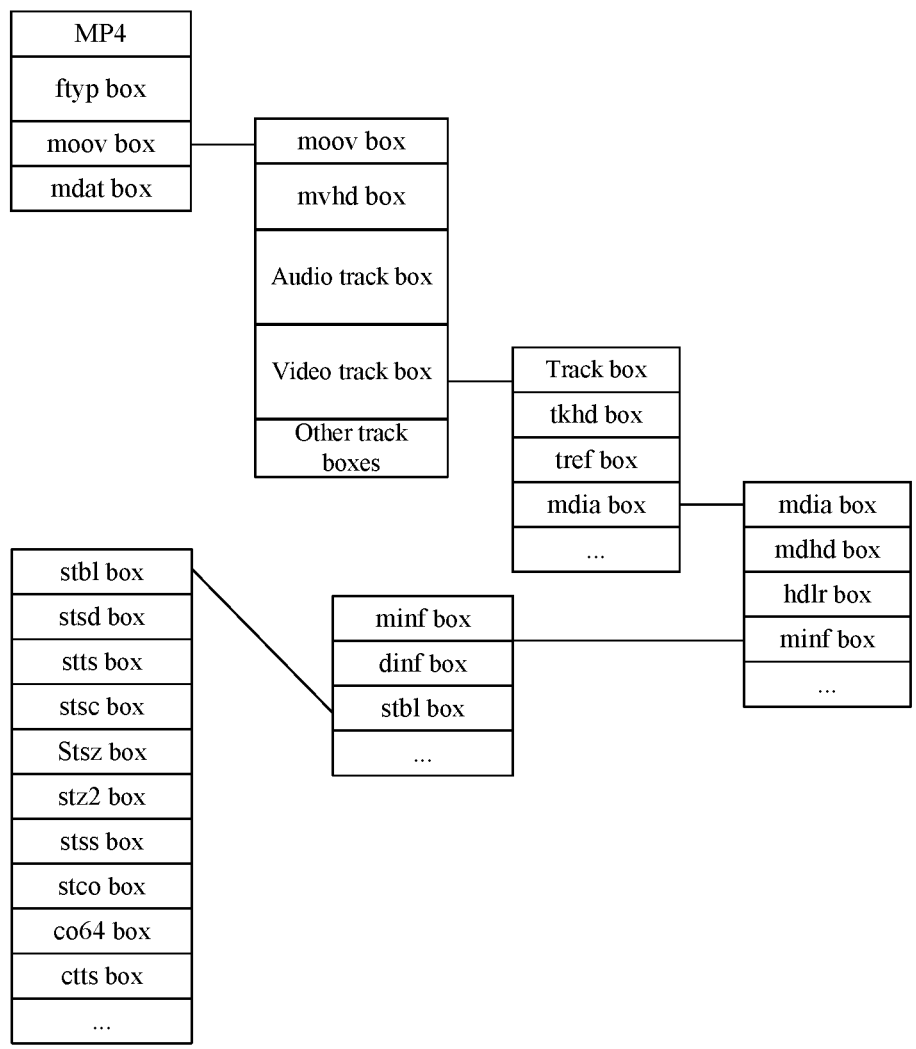
FIG. 2 is a schematic diagram of an optional packaging structure for an MP4 file in an embodiment of the disclosure.

The container header includes a size and a type, the size indicates the length of the container in the media file, and the type indicates the type of the container. FIG. 2 is a schematic diagram of an optional package structure of an MP4 file according to an embodiment of the disclosure. The basic container types involved in the MP4 file include the file type container (ftyp box), the metadata container (moov box), and the media data container (mdat box).

The container data part can store specific data. At this time, the container is called a "data container", and the container data part can further encapsulate other types of containers. At this time, the container is called a "container container".

3) Track, also called a Stream, related to the time-ordered samples (Sample) in the media data container. For media data, a track represents a sequence of video frames or a sequence of audio frames, and may also include a caption track synchronized with a sequence of video frames. A set of consecutive samples in the same track being called blocks.

4) File type container, a container for storing the size (that is, the length of the occupied bytes) and type of the file in the media file. As shown in FIG. 2, the file type container is labeled "ftyp box", where the stored binary data describes the file type and compatibility according to the standard byte length.

5) Metadata container, a container for storing metadata (ie, data describing multimedia data stored in a media data container) in a media file, and information expressed by binary data stored in a metadata container in an MP4 file is referred to as media information.

As shown in FIG. 2, the header of the metadata container uses binary data to indicate that the container type is "moov box", the container data part encapsulates the mvhd container for storing the overall information of the MP4 file, which is independent of the MP4 file and related to the playback of the MP4 file, including period, creation time, and modification time.

The media data container of the media file may include a sub-container corresponding to a plurality of tracks, such as an audio track box and a video track box. References and descriptions of the media data of the corresponding track are included in the audio track container and the sub-container of the video track container, and the necessary sub-containers include: a container for describing the characteristics of the track and overall information (such as period, width and height) (denoted as tkhd box), a container for recording the media information of the track (such as media type and sampled information) (denoted as mdia box).

For the sub-container encapsulated in the mdia box, it may include: a container for recording the relevant attributes and contents of the track (denoted as mdhd box), a container for recording the playback process information of the medium (denoted as hdlr box), and a container for describing the media information of the media data in the track (denoted as minf box). Minf box also encapsulates a sub-container (denoted as dinf box) for interpreting how to locate media information, and a sub-container (recorded as stbl box) for recording all time information (decoding time/display time), position information, and codec in the track.

Figure 3:
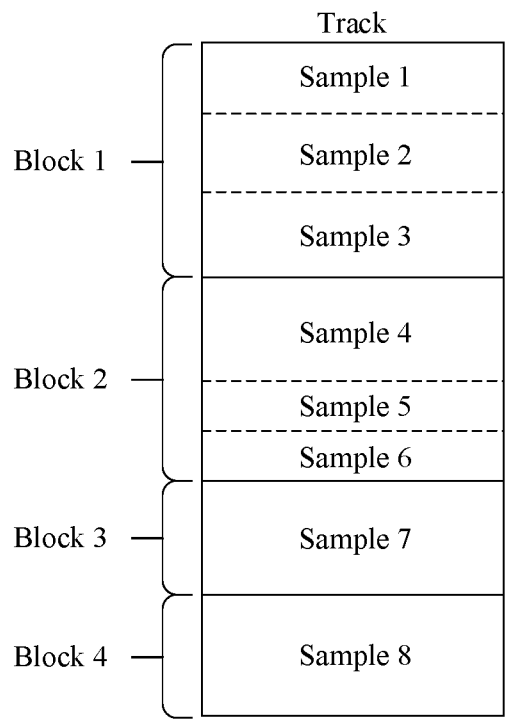
FIG. 3 is a schematic diagram of an optional structure for a media data container in a media file to store media data in an embodiment of the disclosure.

Referring to FIG. 3, is a schematic structural diagram of media data container storage media data in a media file according to an embodiment of the disclosure. Using the media information identified from the binary data in the stbl box, the time, type, capacity of the sample and the position in the media data container can be explained. The following describes the sub-containers in the stbl box.

The stsd box contains a sample description table. According to different coding schemes and the number of files storing data, there may be one or more description tables in each media file. The description table can be used to find the description information of each sample. The description information of each sample can be found through the description table, the description information can ensure the correct decoding of the samples, and different media types store different description information. For example, in the case of video media, the description information is the structure of the image.

The stts box stores the period information of the sample, and provides a table to map the time (decoding time) and the serial number of the sample. Through the sttx box, the sample can be located at any time in the media file. The stts box also uses other tables to map the sampled capacity and pointer, each entry in the table provides the sequence number of consecutive samples in the same time offset, as well as the offset of the sample. By incrementing these offsets, a complete time-sampling mapping table can be created. The calculation formula is as follows:

$$DT(n+1)=DT(n)+STTS(n) \quad (1)$$

Where STTS (n) is the period of the nth sample, DT (n) is the display time of the nth sample. The arrangement of the samples is sorted in chronological order so that the offset is always non-negative. DT generally starts at 0, taking the display time DT(i) of the ith sample as an example. The calculation formula is as follows:

$$DT(i)=SUM(\text{for } j=0 \text{ to } i-1 \text{ of delta}(j)) \quad (2)$$

The sum of all offsets is the length of media data in the track.

The stss box records the sequence number of the key-frame in the media file.

The sts box records the mapping relationship between the sampled and stored samples, and maps the relationship between the serial number of the sample and the serial number of the block through the table. By looking up the table, the block containing the specified sample can be found.

The stco box defines the position of each block in the track, the position being represented by the offset of the starting byte of the media data container, and the length (i.e., capacity) relative to the starting byte.

The stsz box records the capacity (i.e. size) of each sample in the media file.

6) Media data container, a container for storing multimedia data in the media file, for example, a media data container in the MP4 file. As shown in FIG. 3, the sampling the unit stored in the media data container, stored in the block of the media file, the length of the block and the sample may be different.

7) Segmented media files, sub-files formed by segmentation of media files, each segmented media file can be independently decoded.

Taking the MP4 file as an example, the media data in the MP4 file is segmented according to the key frame, and the segmented media data and the corresponding metadata are encapsulated to form a segmented MP4 (FMP4, Fragmented MP4) file. The metadata in each FMP4 file ensures that the media data is correctly decoded.

Figure 4:
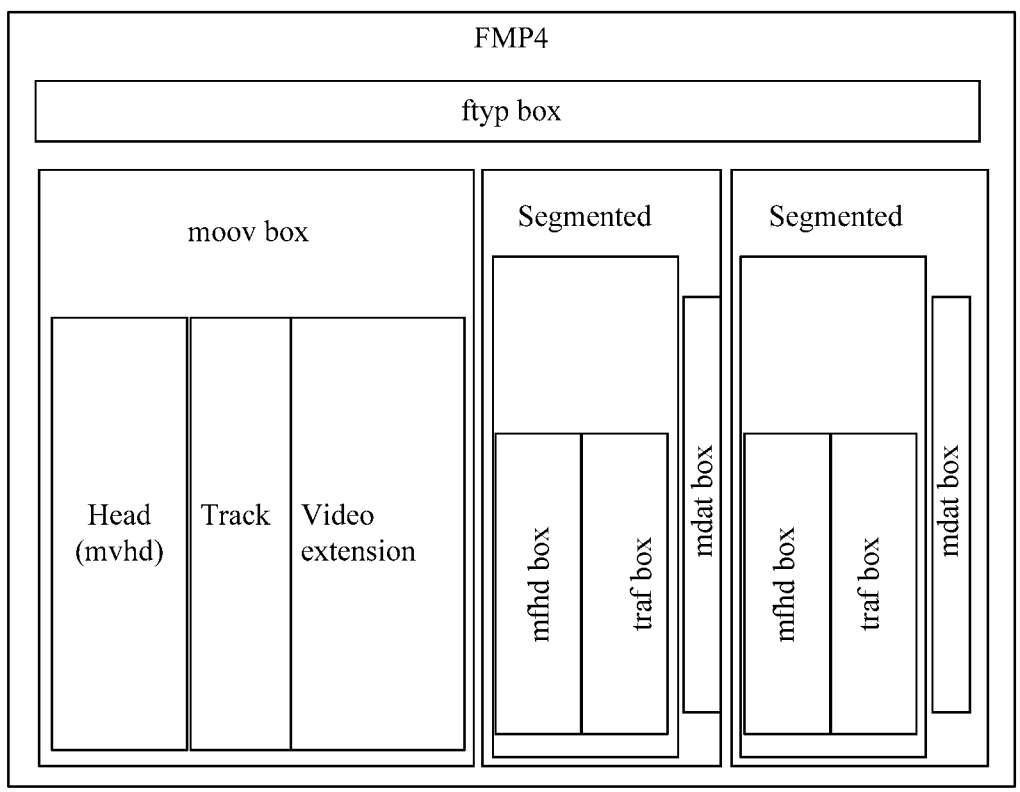
FIG. 4 is a schematic diagram of an optional packaging structure for an FMP4 file in an embodiment of the disclosure.

For example, when converting an MP4 file as shown in FIG. 2 into a plurality of FMP4 files, refer to FIG. 4, which is an optional package structure diagram of an FMP4 file provided by an embodiment of the disclosure, where an MP4 file can be converted into multiple FMP4 files, each FMP4 file consists of three basic containers: a moov container, a moof container, and a mdat container.

The moov container includes MP4 file level metadata to describe all media data in the MP4 file from which the FMP4 file originates, such as the period, creation time, and modification time of the MP4 file.

The moof container stores segment-level metadata for describing the media data encapsulated in the FMP4 file to ensure that the media data in FMP4 can be decoded.

One moof container and One mdat container make up One segment of the segmented MP4 file. One or more such segments may be included in a segmented MP4 file, and the metadata encapsulated in each segment ensures that the media data encapsulated in the segment can be independently decoded.

8) Media Resource Extensions (MSE) interface, which is a player-oriented interface implemented in webpages and is realized by the browser's interpreter and executing a front-end programming language (such as JavaScript) during loading in a webpage. The player is provided with a function of calling a playback media stream of a Hypertext Markup Language (HTML) media element (Media Element), for example, using a video element <video>, and an audio element <audio> to implement a video/audio playback function.

9) Streaming media format, a media file which encapsulates the media data into the streaming media. The media file does not have to be completely downloaded, and does not require additional transcoding, and can be decoded and played, that is, a packaging technology that natively supports downloading while playing. Typical streaming media files include: TS media file fragmentation based on HTTP live streaming (HLS, HTTP Live Streaming) technology, FLU (Flash Video) files, and the like.

10) Non-streaming media format, an encapsulation technology that encapsulates media data into media files and can be decoded and played after the media files are completely downloaded. Typical non-streaming media files include: MP4 files, Windows Media Video (WMV) file, advanced streaming format (ASF) files.

It should be noted that the MP4 file does not natively support playback in streaming form, but the technical effect of playing while downloading and playing the media stream after transcoding the player after online transcoding or the missing part of the partially downloaded MP4 file is filled with invalid binary data, the package format of the file that does not support streaming media playback in this article is It is called a non-streaming format.

First, the device for playing a media file while switching resolution in a webpage of an embodiment of the disclosure will be introduced. The device for playing a media file while switching resolution in a webpage can be provided as hardware, software or a combination of hardware and software.

Figure 5:
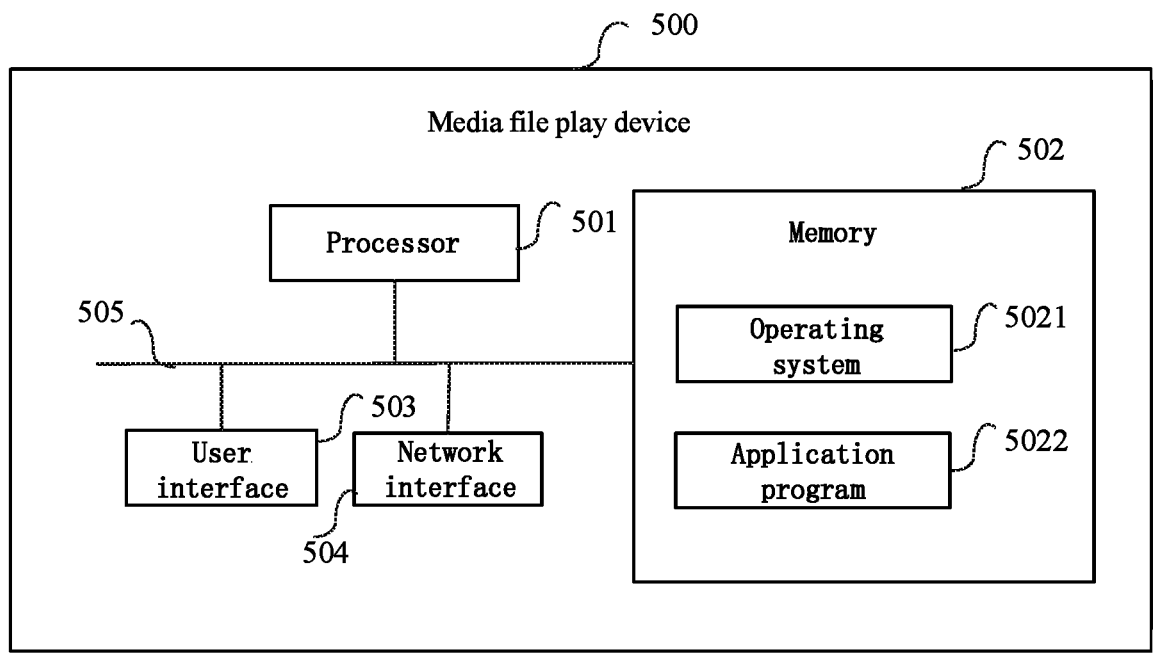
FIG. 5 is a schematic diagram of optional components of a device for playing media files while switching resolution in a webpage according to an embodiment of the disclosure.

An embodiment of the combination of hardware and software of playing a media file while switching resolution in a webpage will be illustrated as follows. Referring to FIG. 5, FIG. 5 is an optional schematic view of a device for playing a media file while switching resolution in a webpage in an embodiment of the disclosure. A device for playing a media file while switching resolution in a webpage 500 can be a mobile phone, a computer, a digital broadcasting terminal, a message transmitter-receiver, a game controller, a tablet, a medical facility, a fitness facility, a personal digital assistant with the function of playing videos and so on. The device for playing a media file while switching resolution in a webpage 500 as shown in FIG. 5 includes at least one processor 501, a memory 502, at least one network interface 504 and a user interface 503. Various components in the device for playing a media file while switching resolution in a webpage 500 are coupled together by a bus system 505. Conceivably, the bus system 505 is utilized to connect and communicate the components. Besides the bus, the bus system 505 further includes a power bus, a control bus and a status signal bus. But for the sake of clear illustration, all sorts of buses in FIG. 5 are marked as the bus system 505.

The user interface 503 can include a display, a keyboard, a mouse, a trackball, a click wheel, a key, a button, a touch panel or a touch screen.

Conceivably, the memory 502 can be a volatile memory or a nonvolatile memory, or both. The nonvolatile memory can be a read only memory (ROM), a programmable read-only memory (PROM), an erasable programmable read-only memory (EPROM), an electrically erasable programmable read-only memory (EEPROM); magnetic memory can be a disk memory or a tape memory. The volatile memory can be a random access memory (RAM), which is used as an external cache. The illustration is exemplary, rather than limitation. Many forms of RAMs are available, such as a static random access memory (SRAM), a synchronous static random access memory (SSRAM), a dynamic random access memory (DRAM), a synchronous dynamic random access memory (SDRAM). The memory 502 provided in embodiments of the disclosure is aimed at including aforementioned and other suitable memories.

The memory 502 in an embodiment of the disclosure includes but not limited to a ternary content-addressable memory (TCAM), a static random access memory, which can store media file data obtained from a server to support the operation of the device for playing a media file while switching resolution in a webpage 500. Examples of the data include any computer program run over the device for playing a media file while switching resolution in a webpage 500, such as an operating system 5021, an application program 5022, and various types of media file data information. The operating system 5021 includes a variety of system programs, such as a frame layer, a core library layer, a driver layer, configured for supporting various basic services and handling missions based on hardware. The disclosure program 5022 can include all sorts of disclosure programs, such as a client with a function of playing a media file while switching resolution in a webpage, or an application, etc. Programs with a method for playing a media file while switching resolution in a webpage in embodiments of the disclosure can be included in the disclosure program 5022.

Methods disclosed by embodiments of the disclosure are acquired by the processor 501. The processor 501 can be an integrated circuit chip with abilities to process signals. During the process, the method for playing a media file while switching resolution in a webpage provided by embodiments of the disclosure can be fulfilled by an integrated logic circuit of hardware or manipulation of software in the processor 501. The processor 501 can be a communication processor, a digital signal processor (DSP), or other programmable logic devices, a discrete gate or a transistor logic device, a discrete hardware component, etc. The processor 501 can implement or perform all methods, steps and logic diagrams provided in embodiments of the disclosure. The communication processor can be a microprocessor or any other conventional processor. Combined with steps of methods provided of embodiments of the disclosure, the result can be processed by hardware decoding processors or mixture of hardware and software in decoding processors. Software modules can be located in a storage medium. The storage medium locates in the memory 502. The processor 501 reads information in the memory 502, and runs the mothed for playing a media file while switching resolution in a webpage with the aid of hardware.

In an exemplary embodiment, an embodiment of the disclosure further provides a computer readable storage medium, including the memory 502 of a computer program. The aforementioned computer program can be processed by the processor 501 of the device for playing a media file while switching resolution in a webpage 500 to run the method for playing a media file while switching resolution in a webpage. The computer readable storage medium can be a memory such as an FRAM, an ROM, a PROM, an EPROM, an EEPROM, a flash memory, a magic memory, a compact disc, or a CD-ROM; or a device including one or more memories above, such as a mobile phone, a computer, a tablet, a personal digital assistant, etc.

The hardware achievement of the device for playing a media file while switching resolution in a webpage will be illustrated below. The device for playing a media file while switching resolution in a webpage in embodiments of the disclosure can be fulfilled by one or more disclosure specific integrated circuit (ASIC), DSP, programmable logic device (PLD), complex programmable logic device (CPLD), field-programmable gate array (FPGA) or other electrical elements, configured for performing the device for playing a media file while switching resolution in a webpage provided by embodiments of the disclosure.

The software achievement of the device for playing a media file while switching resolution in a webpage will be illustrated below. The device for playing a media file while switching resolution in a webpage in embodiments of the disclosure can be fulfilled by disclosure programs or plug-ins, or a combination of both.

As an example, an disclosure program can be a client specific for playing a media file while switching resolution in a webpage, or a client with an optical service of the function for playing a media file while switching resolution in a webpage, which will be activated by installing a corresponding plug-in.

As an example, the plug-in can upgrade installation package for disclosure programs and the function of synchronizing play the media files in the disclosure for non-media playback.

Figure 6:
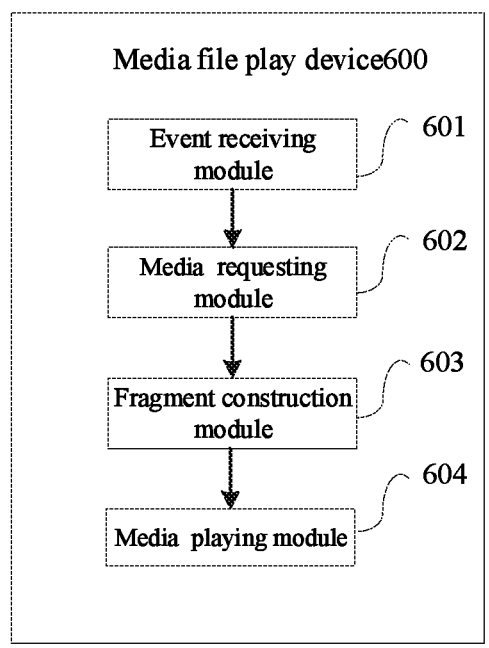
FIG. 6 is a schematic diagram of optional components of a device for playing media files while switching resolution in a webpage according to an embodiment of the disclosure.

As an example of a hardware implementation or a software implementation of a device for playing media files in a webpage while switching resolution, the device for playing media files in a webpage while switching resolution may be provided as a series of modules coupled at a signal/information/data level, which will be described below with reference to FIG. 6. FIG. 6 is a schematic diagram of an optional composition of a device for playing media files while switching resolution in a webpage according to an embodiment of the disclosure, which shows a series of modules included in the device for playing media files in a webpage while switching resolution, but the structure of the modules of the device for playing media files in a webpage while switching resolution is not limited thereto, for example, the modules therein may be further divided or combined according to different functions implemented. The functions implemented by the modules shown in FIG. 6 are described below.

An event receiving module 601 is configured for receiving a resolution switching event when the player embedded in the webpage plays the original resolution media file.

A data requesting module 602 is configured for requesting media data in the target resolution media file to be switched to in response to the resolution switching event.

The data requesting module 602 is configured for determining two key frames in the target resolution media file on the basis of the time of the video frame represented by the media information of the target resolution media file; wherein decoding time of the two key frames is endpoint time of a given period, and the given period is used for continuing the playing point of the original resolution file; the data requesting module 602 is configured for requesting media data in the target resolution media file on the basis of the location of the media data represented by the media information in the target resolution file, the decoding time of the requested media data being within the given period.

A fragment construction module 603 is configured for constructing a fragmented media file for independent decoding on the basis of the requested media data.

A media playing module 604 is configured for sending the fragmented media file to the media element of a webpage through the media source expansion interface of the webpage, wherein the fragmented media file is used for the media element to play in succession with the playing point where the resolution switching event occurs.

Wherein the period of the given period is less than or equal to a preloading period, and the preloading period is less than the playing period of the target resolution media file.

In some embodiments, the fragment construction module 603 is configured for calculating metadata corresponding to the media data, the calculated metadata carrying media information for supporting decoding of the media data; and the fragment construction module is configured for filling the calculated metadata and the media data between the two key frames into the packaging structure of fragmented media files to acquire the corresponding fragmented media file.

In some embodiments, the event receiving module 601 is configured for adding the constructed fragmented media file to a media source object in the media resource expansion interface; the event receiving module 601 is configured for creating a virtual address corresponding to the media source object; and the event receiving module 601 is configured for transmitting the virtual address to the media element of the webpage, wherein the virtual address is used for the media element to play by taking the media source object as a data source.

In some embodiments, the media playing module 604 is further configured for continuing playing on the basis of the original resolution the fragmented media file when the resolution switching event is received, until the fragmented construction module completes the target resolution fragmented media file that is sent by the media playing module 604 through the media source expansion interface. Therefore, the player can continue to play the fragmented media file on the basis of the original resolution while switching resolution, so that video buffering and lag of playing the media file caused by switching resolution in the webpage in the meantime are avoided, and the user experience is improved.

Figure 7:
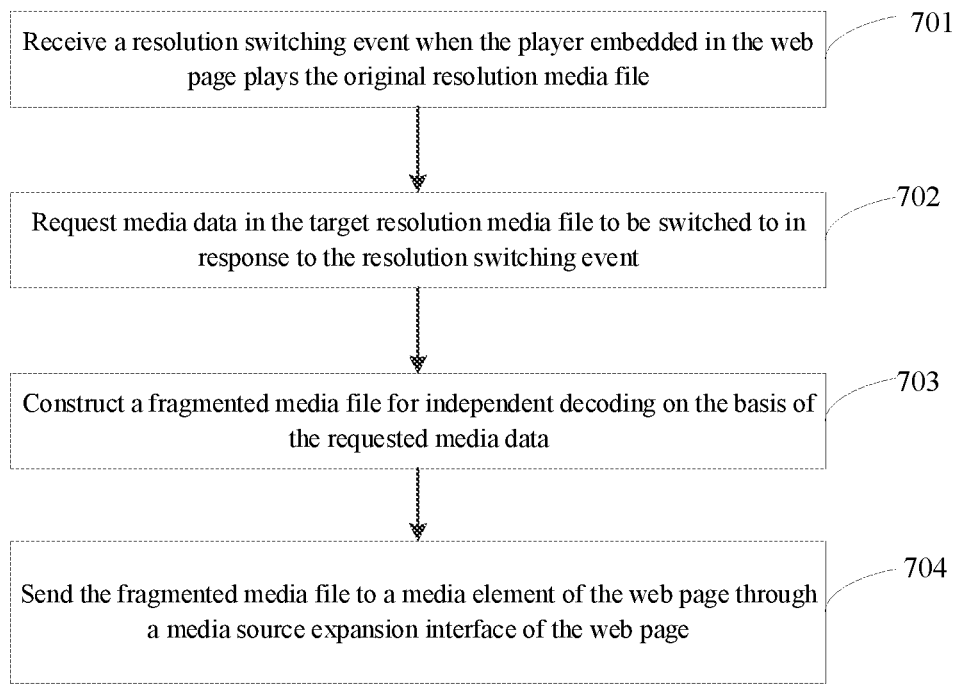
FIG. 7 is a schematic diagram of an optional process of a method for playing media files while switching resolution in a webpage provided by an embodiment of the disclosure.

In some embodiments, the player requests media data in the target resolution media file to be switched to in response to a resolution switching event and constructs the requested media data into a corresponding fragmented media file that can be independently decoded. With reference to FIG. 7, which is a schematic diagram of an optional process of a method for playing media files while switching resolution in a webpage provided by an embodiment of the disclosure; description will be provided in conjunction with the steps shown in FIG. 7.

In some examples described below, with the media file in the MPEG-4 format as an example, implementations of other non-streaming media formats are readily conceivable with reference to the MPEG-4 implementation.

At step 701, a resolution switching event is received when the player embedded in the webpage plays the original resolution media file.

At step 702, the player requests media data in the target resolution media file to be switched to in response to the resolution switching event, wherein the original resolution media file and the target resolution media file adopt a non-streaming media packaging format.

The player sends a network request for media data in the media file to a server.

In some embodiments, the player may send a network request for media data in the media file to the server by: determining two key frames in a media file to be played on the basis of a real-time playing point in the playing process of the media file; and sending a network request to the server, the network request requesting to acquire the media data between the two key frames in the media file.

The determination of two key frames on the basis of the playing point is described as follows. In the process of playing the media file, the player plays the media file by loading the data between the key frames, that is, the player takes the media data between the two key frames as a playing loading unit. With regard to the playing point, the playing point be selected as a moment during playing that can be reached by continuously playing the media file (i.e., without user intervention), for example, from 00:30:00 to 00:40:00; it is also possible to reach a playing point by means of jumping (i.e., the user clicks a progress bar to jump), for example, form the original playing point at 20% to a playing point at 30% of the playing progress.

In practical disclosure, two key frames determined on the basis of the playing point can be two adjacent key frames in the media file, or one or more other key frames between the two key frames, and the number of the key frames between the two key frames can be determined according to the caching performance (such as the available caching capacity) of the browser, the network performance (the network bandwidth) and the like, and can also be set according to practical requirements.

In some embodiments, the method by which the two key frames (set as the first key frame, and the second key frame after the first key frame at the decoding time) are determined is described with respect to the cases where the playing point is reached by playing the media file continuously and whether the video frame corresponding to the playing point is a common frame or a key frame.

Case 1): if the video frame corresponding to the playing point is a common frame, and since the player takes the media data between two key frames as a basic play loading unit, the media data after the playing point and before the first key frame that follows the playing point (the key frame closest to the playing point in the key frames that are decoded later than the playing point) are loaded media data; in order to avoid acquiring the loaded media data repeatedly, the first key frame of the two key frames of a given period is the first key frame decoded after the playing point in the media file; the second key frame of the two key frames is a key frame decoded after the first key frame in the media file.

Case 2): if the video frame corresponding to the playing point is a key frame, the first key frame of the two key frames is a key frame corresponding to the playing point, namely the key frame aligned with the playing point in time; the second key frame of the two key frames is a key frame decoded after the first key frame in the media file.

In the above case 1), taking the key frame spanning over the playing point as the end point of the media data can ensure that the video frame corresponding to the playing point has sufficient information for correct decoding, and frame skipping due to the lack of data to be decoded (i.e., the key frame) is avoided.

In another embodiment, the method by which the two key frames (set as the first key frame, and the second key frame decoded after the first key frame) are determined is described with respect to the cases where the playing point is reached by jumping and whether the video frame corresponding to the playing point is a common frame or a key frame.

Case 1): if the video frame corresponding to the playing point is a common frame, and since the playing point is reached by jumping, the media data between the first key frame before the playing point and the playing point are not loaded, and the first key frame is the first key frame decoded before the playing point in the media file, namely a key frame having a decoding time, searched from the time of the media data (i.e., the corresponding relationship between the serial number represented by the media information and the decoding time of the frame), earlier than and closest to the start time of the given period in the media file; the second key frame of the two key frames is a key frame decoded after the first key frame in the media file. Additionally requesting the media data between the playing point and the key frame before the playing point can ensure normal decoding no matter which a playing point is reached by jumping, so that frame skipping due to failure in decoding when the playing point corresponds to a common frame is avoided.

Case 2): if the video frame corresponding to the playing point is a key frame, the first key frame is a key frame corresponding to the playing point, namely, the key frame having a decoding time, searched from the time of the media data (i.e., the corresponding relationship between the serial number represented by the media information and the decoding time of the frame), aligned with the time of the playing point; the second key frame of the two key frames is a key frame decoded after the first key frame in the media file.

In the above case 1), taking the key frame spanning over the playing point as the end point of the media data can ensure that the video frame corresponding to the playing point has enough information for correct decoding, and frame skipping due to the lack of data to be decoded (i.e., the key frame) is avoided.

In case 2), the media data to be acquired are defined by the key frames aligned with the playing points, therefore, on the premise that the playing point can be decoded correctly, acquisition of unnecessary media data is reduced to the minimum extent, the occupation of connection and flow is reduced, and the real-time performance of non-media playing services in the webpage is further guaranteed.

In some embodiments, the network request sent by the player to the server carries the offset and the capacity of the requested media data between the two key frames, such that the server extracts media data starting from the offset and conforming to the capacity from the media file and returns to the player. Therefore, before the network request being sent, the player needs to determine the offset and the capacity of the media data in the media file according to the media information identified by the metadata of the media file (i.e., information about the position, offset, decoding time and the like of the video/audio frame). And it is supposed to identify the media information from the metadata the media file before determining the offset and the capacity.

The method for the player to identify the media information will be described below. In some embodiments, the player may identify the media information from the media file by: according to the set offset and capacity, requesting data in the media file corresponding to the set offset and capacity from the server (i.e., requesting data with a fixed capacity), identifying the metadata in the metadata container from the data returned by the server, and parsing the identified metadata to acquire media information used for describing the media data packaged in the media data container of the media file.

The set capacity can be acquired by statistics according to the capacity of the file type container and the metadata container of the existing media file, so that the set capacity can cover the sum of the capacities of the file type container and the metadata container of a set proportion (e.g., all) of the media file, which ensures that when the packaging structure of the media file is sequentially packaged file type container, metadata container and media data container, the metadata packaged in the complete metadata container can be acquired through a request for once, so that the occupation of the connection during network transmission is reduced, and the response delay due to the fact that little enough connection can be spared for non-media playing services in the webpage in addition to the occupation is avoided.

Taking an MP4 file as an example of the media file, the metadata packaged in the metadata container acquired by the player are the binary data packaged in the moov box in the MP4 file, and when the packaging structure of the MP4 file is sequentially packaged fytp box, moov box and mdat box, the set capacity can be acquired by statistics according to the capacities of the ftyp box and moov box of the existing MP4 file, such that the set capacity can cover the sum of the binary data of the ftyp box and the moov box of a set proportion (e.g., all) of the MP4 file, which ensures that the complete binary data included in the moov box can be acquired from the server through a request for once in most cases.

In some embodiments, in the binary data requested by the player from the server according to the set offset and capacity, the section of the binary data starting from zero bytes corresponds to the file type container, the player acquires the capacity of the file type container by reading the header of the container, and acquires the type and the capacity of the next container by reading the header of the second container, and a case where the type of the second container is a metadata container and the capacity of the returned binary data is not less than the sum of the capacity of the file type container and the capacity of the metadata container indicates that the binary data requested from the server according to the set offset and capacity includes the metadata packaged in the metadata container; while a case where the type of the second container is a metadata container and the capacity of the returned binary data is less than the sum of the capacity of the file type container and the capacity of the metadata container indicates that the binary data requested from the server according to the set offset and capacity does not includes the metadata packaged in the metadata container. In the case that the binary data requested by the player from the server according to the set offset and capacity do not include the complete metadata in the metadata container, the player needs to read the capacity of the container from the binary data returned by the server, calculate the offset and the capacity of the metadata container according to the header of the metadata container, and send a network request with the calculated offset and capacity carried to request the metadata from the server; the server reads binary data from the offset calculated in the media file according to the request, and returns the data to the player when the read binary data conforms to the calculated capacity.

As an example, the player reads the capacity of the container from the binary data returned by the server, and calculates the offset and the capacity of the metadata container according to the header of the metadata container, including the following two cases:

Case 1): when the type of the container read from the rest binary data (i.e., the data other than the binary data of the file type container in the returned binary data) is a metadata container, and the capacity of the rest binary data is less than the capacity of the metadata container, the difference between the capacity of the metadata container and the capacity of the rest binary data is calculated as a new capacity for the second request, the sum of the offset the capacity for the first request is taken as a new offset, on this basis, the second request for binary data is sent to the server;

Case 2): when the type of the container read from the rest binary data is a media data container, the sum of the capacity of the media data container and the capacity of the file type container is calculated as a new offset for the second request, and a set capacity (which may be an empirical value capable of covering the capacity of the metadata container) is taken, on this basis, the second request for binary data is sent to the server.

Taking an MP4 file as an example of the media file, the binary data requested by the player from the server according to the set offset and capacity does not contain the complete binary data of the moov box, and moreover, the player needs to read the type and capacity of the container from the binary data returned by the server to determine the offset and the capacity of the moov box in the MP4 file;

According to the binary data of the MP4 file, the starting byte always corresponds to the ftyp box, the binary data of the fytp box are identified from the returned binary data, and the length of the fytp box can be known according to the header of the ftyp box, so that the binary data of the next box are read from the rest binary data according to the standard length of the header, including the following cases according to the container type represented by the header:

1) When the type of the container read from the rest binary data (i.e., the data other than the binary data of the fytp box in the returned binary data) is moov box, and the capacity of the rest binary data is not less than the capacity of the moov box, the moov data starting with the offset of the moov box in the MP4 file and conforming to the capacity of the moov box in the MP4 file are acquired from the server according to the determined offset and capacity;

2) When the type of the container read from the rest binary data is moov box, and the capacity of the rest binary data is less than the capacity of the moov box, the difference between the capacity of the moov box and the capacity of the rest binary data is calculated as a new capacity for a second request, and the sum of the offset and the capacity for the first request is taken as a new offset, on this basis, the second request for binary data is sent to the server; and 3) When the type of the container read from the rest binary data is the mdat box, the sum of the capacity of the mdat box and the capacity of the ftyp box is calculated as a new offset for a second request, and a set capacity is taken, on this basis, the second request for binary data is sent to the server.

Therefore, regardless of the packaging structure of the media file, namely, regardless of the packaging sequence of the file type container, the metadata container and the media data container in the media file, the metadata in the metadata container can be acquired from the server by the player at most two requests, and thus the metadata acquisition efficiency is improved.

As an example, for an MP4 file, a section, from zero bytes, of the binary data returned by the server corresponds to ftyp box according to the packaging specification of the MP4 file, and the capacity (i.e., length) of the ftyp box and the capacity of a complete MP4 file can be read from the header of the ftyp box according to the packaging specification of the header of the box; given that the capacity of the ftyp box is a (in bytes), the header information of the subsequent container is read starting from a+1 to acquire the type and capacity of the subsequent container, and if the ftyp box is followed by the moov box acquired by reading, and the capacity of the rest binary data (the set capacity minus the capacity of the ftyp box) is larger than the capacity of the moov box, it's proven that the complete binary data of the moov box has been retrieved, and the metadata in the moov box can be extracted from the rest binary data according to the offset and the capacity of the moov box.

The player parses a nested structure of sub-containers in the metadata container after acquiring the metadata packaged in the metadata container from the server, and reads binary data in each sub-container according to the nested structure of the sub-containers; and the player parses out the media information of the media data characterized by each sub-container from the read binary data. In practical disclosure, the media information may include offset, capacity, decoding time and the like of video frames and/or audio frames in the media file.

Taking an MP4 file as an example of the media file, the metadata container is moov box, with reference to FIG. 2, it can be known that mvhd box and track box are packaged in the moov box, wherein information such as creation time, modification time, a time measurement scale, playable period, default volume and the like of the MP4 file can be acquired by parsing binary data of the mvhd box; the moov box includes a plurality of track boxes which record description information specific to each media track, for example, for a video track box, a plurality of sub-containers are nested in multiple layers in the video track box, video frame information and corresponding picture information of an MP4 file are acquired by parsing corresponding binary data on the basis of a nested structure of the video track box.

In some embodiments, the player can parse the acquired metadata to acquire media information by: sequentially parsing the binary data corresponding to the standard length of the header of the container in the binary data of the metadata container to acquire the container type of the sub-container in the metadata container and the length of the container data of the sub-container; calling a parser of a type corresponding to the container type of the sub-container, sequentially parsing binary data corresponding to the length of the container data in unparsed data to acquire media information represented by the container data.

With respect to the situation that a plurality of sub-containers are nested in the metadata container, the offset each time the player reads the binary data is the sum of the lengths of the sub-containers, and the lengths of the read binary data conform to the standard length of the container header, so that the type and the length of the currently processed sub-container can be parsed out.

For example, when reading for the first time, the player reads from zero bytes of the binary data of the metadata container, and the length of the read binary data conforms to the standard length of the container header, so that the type and the length of a first sub-container can be parsed out; when reading for the second time, the player starts reading the binary data starts by taking the length of the firstly read sub-container as an offset, and the length of the read binary data conforms to the standard length of the container header, so that the type and the length of the second sub-container can be parsed out.

According to the above method for reading the binary data, rollback due to redundant reads does not occur, and a second read due to inadequate reads does not occur, therefore, the efficiency and the accuracy are ensured.

In some embodiments, a typical container type nested in a metadata container is pre-labeled to indicate whether the container is directly used to package binary data or is further packaged with a container, for example, the mvhd box, audio track box, and video track box shown in FIG. 2 are labeled as further packaged with containers, and the stts box, stsd box and the like shown in FIG. 2 are labeled as directly packaging binary data.

For the container types labeled as directly packaging binary data, parsers corresponding to the container types one by one are set for parsing out the represented media information according to the binary data; the parsed out container type of a sub-container is compared with the pre-labeled container type, including the following two cases.

Case 1): when it is determined through comparison that the container type of the sub-container is pre-labeled and pre-labeled as directly packaging binary data, a parser corresponding to the container type of the sub-container is called, and the container data in the sub-container are parsed by the parser to acquire media information represented by the container data.

Case 2): when it is determined through comparison that the container type of the sub-container is pre-labeled and pre-labeled as further packaged with a container, recursively parsing the binary data corresponding to the sub-container according to the standard length of the container header in the media file, until a container, packaged in the sub-container, having the container type pre-labeled and pre-labeled as directly packaging binary data is parsed out, a parser corresponding to the container type of the container packaged in the sub-container is called to parse binary byte by byte, wherein the length of the parsed binary data corresponds to the length of the container data of the container packaged in the sub-container, so as to acquire media information represented by the container data of the container packaged in the sub-container.

In some embodiments, a method of recording media information in parsing a metadata container is described, when the container type of a sub-container in the metadata container is acquired by sequentially parsing binary data corresponding to a standard length of a container header in binary data of a metadata container, an object is established according to a nested relationship between the sub-container and the container to which the sub-container belongs and a nested relationship between the sub-container and the packaged container; when the container type of a sub-container is pre-labeled as directly packaging binary data, an array including media information is stored in the object created corresponding to the sub-container, the stored media information being represented by the container data of the sub-container.

For example, in FIG. 2, when the type of the parsed sub-container is stts box, since the stts box is pre-labeled as directly packaging binary data, an array including media information, which is period information represented by the container data of the stts box, is stored in an object established corresponding to the stts box.

In some embodiments, the method of recording the nested relationship between sub-containers during parsing a metadata container is described, when binary data corresponding to a standard length of a container header in metadata container binary data is sequentially parsed to acquire the container type of a sub-container in the metadata container, if the container type is pre-labeled as directly packaging binary data, the parsed sub-container is recorded in the called parser; an example of the recorded sub-container is set among attributes of the sub-container, and the attributes include a container to which the sub-container belongs, for describing a nested relationship between the sub-container and the container to which the sub-container belongs.

For example, in FIG. 2, when the type of the parsed sub-container is stsd box, since the stsd box is pre-labeled as directly packaging binary data, the stsd box is recorded in the parser corresponding to the stsd box, the instance of the stsd box is set among attributes of the stbl box sub-container, and so on, and finally the stsd box, the stts box and, the stsc box and other sub-containers nested in the stbl box are recorded in the sub-container attributes of the stsd box.

In some embodiments, when it is determined through comparison that the container type of the sub-container is not pre-labeled, or is pre-labeled as directly packaging binary data but without calling a parser of a corresponding type, the binary data corresponding to the parsing sub-container are ignored, and according to the length of the sub-container, the parsing process jumps to the part corresponding to the next sub-container in the binary data to continue parsing.

In practical disclosure, a user-defined container type appears in a media file, the overall parsing progress of a metadata container is not affected regardless of jumping, moreover, when the container type of the metadata container changes, compatible parsing of the latest metadata container can be quickly done by adding, deleting and modifying a parser of a corresponding type by setting the parser, and which shows flexibility and rapidness in upgrading.

On the basis of the above description of the identification of the media information, and determining the offset and the capacity of the media data in the media file on the basis of the identified media information is described as follows, in some embodiments, the player may determine the offset and the capacity of the media data in the media file by: on the basis of the identified media information, determining an offset and capacity of a video frame of the media data (i.e., a video frame between a first key frame and a second key frame) in the media file, and an offset and capacity of an audio frame aligned with the video frame in the media file; according to the determined offset and capacity, determining the offset and the capacity of a target interval (an interval formed by the minimum offset and the maximum capacity) including the video frame and the audio frame, wherein the target interval includes the above-mentioned video frame and audio frame.

The manner in which audio frames and video frames are aligned in the embodiments of the disclosure is described herein: an audio frame synchronized with the video frame in time is positioned according to the start time and period of the media data by taking the video frame as a reference to ensure that the decoding start time of the first audio frame in the media data is not later than the decoding start time of the first video frame, and the decoding time of the last audio frame is not earlier than the decoding end time of the last video frame, so that the problem of inconsistent video and audio periods in the media file can be eliminated, synchronous playing of the audio and video is guaranteed, and pictures with no sound will not happen.

Determining the offset and the capacity of the target interval is described as follows: a video frame is positioned in the metadata container according to the offset and the capacity of the video frame between the first key frame and the second key frame in the two key frames in the media file, an audio frame is positioned in the metadata container according to the offset and the capacity of the audio frame aligned with the video frame in the media file, an interval formed by an upper limit and a lower limit of the position, namely, the interval formed by the minimum offset and the maximum capacity, is taken as a target interval; wherein the offset and the capacity corresponding to the upper limit of the position are the offset and the capacity corresponding to the upper limit of the target interval, and the offset and the capacity corresponding to the lower limit of the position are the offset and the capacity corresponding to the lower limit of the target interval. In practical disclosure, the target interval is the smallest interval in which video frames and audio frames are stored in the media data container of the target resolution media file, for example: the offset of the position of the video frame between the first key frame and the second key frame in the target resolution media file corresponds to an interval [a, b] (the address is in an ascending order), the offset of the position of the audio frame in the target resolution media file corresponds to an interval [c, d] (the address is in an ascending order), and then the interval formed by the upper limit and the lower limit of the position is [min (a, c), max (b, d)]. Therefore, the player sends a network request carrying the offset and the capacity of the target interval to the server so as to request the media data of the target interval, and the server extracts the media data in the media file according to the offset and the capacity of the target interval and returns the media data of the target interval for once without secondary acquisition, thereby reducing the requests of the player, and improving the processing efficiency.

At step 703, a fragmented media file for independent decoding is constructed on the basis of the requested media data.

Specifically, the server parses after receiving the network request of the player to acquire the offset and the capacity corresponding to the media data requested by the player, and extracts the media data starting from the offset and conforming to the capacity from the media file according to the offset and the capacity.

After the server extracts the media data, a fragmented media file can be constructed in the following manner the server calculates the fragmented media file level metadata according to the media information of the media data, and then fills the fragmented media file level metadata and the media data according to the packaging format of the fragmented media file to acquire the fragmented media file.

In some embodiments, the server does not convert all media files requested by the player in a non-streaming media format into fragmented media files, for example, the server can only convert a specific media file (i.e., a hotspot file), the server stores the identification of the media file to be converted (i.e., the hotspot file), the network request carries the identification of the media file, and the server parses the network request to acquire the identification of the media file, determines whether the media file is the media file to be converted or not on the basis of the identification of the media file, and extracts the media data and constructs the fragmented media file only when the media file is determined to be converted; if the media file corresponding to the media data requested by the player is determined not to be the media file to be converted on the basis of the media file identification, construction of fragmented media files on the extracted media data will not happen.

In some embodiments, the server does not construct fragmented media files on all of the media data in the media file; for example, the server constructs fragmented media files only on a particular part of the media data in the media file (e.g., the second half of the media file). The network request carries the offset and the capacity of the media data in the media file for the server to position the media data in the media file according to the offset and the capacity; if the server confirms that the media data requested by the player are the media data to be converted in the media file on the basis of the acquired position, construction of fragmented media files is carried out on extracted media data, and if the server confirms that the media data requested by the player are not the media data to be converted on the basis of the acquired position, the media data are directly returned without constructing fragmented media files.

In some embodiments, the network request may also carry authentication information for the server to authenticate the validity of a user, for example, the authentication information may be login information (user name, password) of the user, the server authenticates the validity of the user on the basis of the login information of the user after parsing the network request, and returns a fragmented media file constructed on the extracted media data when the server confirms that the validity of the user passes the authentication on the basis of the authentication information.

Figure 8:
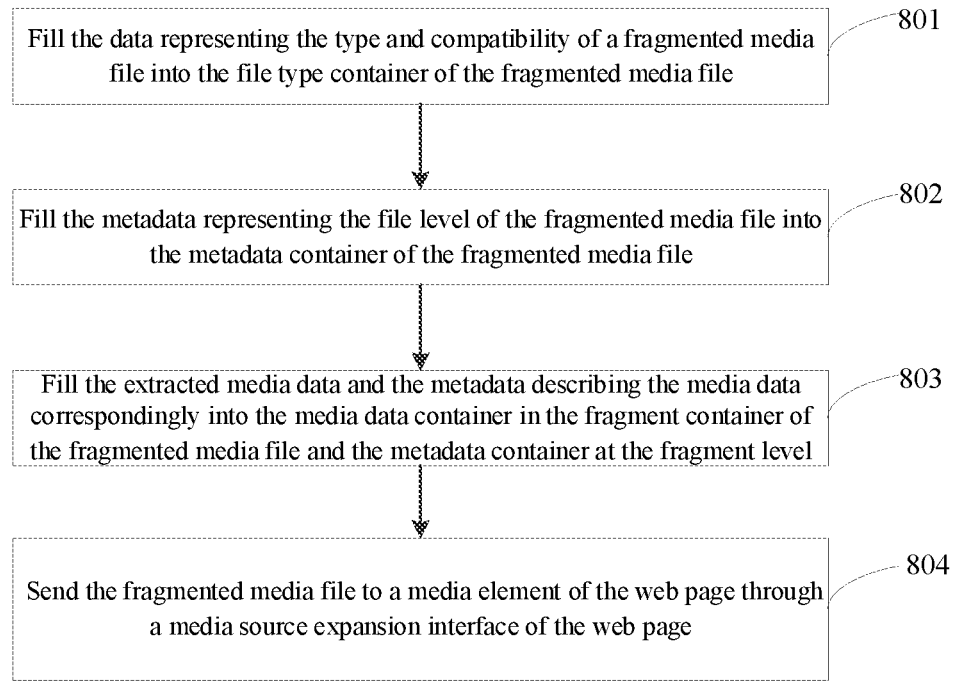
FIG. 8 is a schematic diagram of an optional process for packaging a fragmented media file provided by an embodiment of the disclosure.

Filling the fragmented media file level metadata and the media data according to the packaging format of the fragmented media file to acquire the fragmented media file is described as follows. In some embodiments, reference is made to FIG. 8, which is a schematic diagram of an optional process for packaging a fragmented media file provided by an embodiment of the disclosure, description will be provided in conjunction with the steps shown in FIG. 8.

At step 801, data representing the type and compatibility of a fragmented media file are filled into the file type container of the fragmented media file.

For example, taking the FMP4 file packaged to form the packaging structure shown in FIG. 4 as an example, the type and length of the container (representing the overall length of the ftyp box) are filled in the file type container of the FMP4 file, i.e., the header of the ftyp box, and data (binary data) representing the file type as FMP4 and a compatible protocol are generated after being filled in the data part of the ftyp box.

At step 802, metadata representing the file level of the fragmented media file are filled into the metadata container of the fragmented media file.

In some embodiments, the metadata describing the media data required to fill the nested structure are computed on the basis of the media data to be filled into the packaged structure of the fragmented media file and the nested structure of the metadata container in the fragmented media file.

Still taking FIG. 4 as an example, the metadata representing the file level of the FMP4 file are computed and filled into a metadata container (i.e., moov box) of the FMP4, in which three containers mvhd, track, and video extension (mvex, movie extend) are nested.

The metadata packaged in the mvhd container are used for representing media information related to the playing of the fragmented media file, which includes position, period, creation time, modification time and the like; the sub-containers nested in the track container represent references and descriptions of corresponding tracks in the media data, for example, a container (denoted as tkhd box) describing characteristics and general information (such as period, width) of a track and a container (denoted as mdia box) recording media information (such as media type and sampled information) of a track are nested in the track container.

At step 803, the extracted media data and the metadata describing the media data are correspondingly filled into the media data container in the fragment container of the fragmented media file and the metadata container at the fragment level.

In some embodiments, one or more fragments may be packaged in a fragmented media file and, for media data to be filled, may be filled into one or more fragmented media data containers (i.e., mdat box) of the fragmented media file, each fragment having packaged therein a fragment level metadata container (denoted as a moof box), wherein the filled metadata are used to describe the media data filled in the fragment, allowing the fragments to be decoded independently.

In combination with FIG. 4, filling the media data to be filled into two fragments of the packaging structure of the FMP4 file is taken as an example of filling the media data into each fragment; the metadata that need to be filled into the fragment level metadata container (i.e., moof box) of the corresponding fragment is computed and correspondingly filled into the sub-container nested in the moof box, wherein the sub-container in the header of the moof box is called the moof box, in which the binary data are used for indicating the type of the container as "moof box" and the length of the moof box.

In one embodiment of filling data into corresponding containers in steps 801 through 803, when a filling operation is performed, writing function of a class is called to complete writing and merging of binary data in a memory buffer of the sub-container, and an instance of the class is returned for merging the sub-container with a sub-container having a nested relationship thereto.

As an example of filling data, a class MP4 for realizing an packaging function is created, and each sub-container in a fragmented media file is packaged into a static method of a class Stream; a class Stream for realizing a binary data operation function is created, wherein each class stream is provided with a memory buffer area for storing binary data to be filled; multi-byte decimal data to be filled are converted into binary data through a static method provided by Stream; combining and filling binary data to be filled into a sub-container in a memory buffer area are completed through a writing function provided by an instance of the class Stream; the static method provided by Stream returns a new Stream instance to merge the current sub-container with other sub-containers with nested relationships thereto.

At step 804, the fragmented media file is sent to a media element of the webpage through a media source expansion interface of the webpage, wherein the fragmented media file is used for playing the media element in succession with a playing point where the resolution switching event occurs.

At step 704, the fragmented media file is sent to a media element of the webpage through a media source expansion interface of the webpage. And the fragmented media file is used for playing the media element in succession with the playing point where the resolution switching event occurs.

In some embodiments, sending a fragmented media file, by the player, to a media element of a webpage through a media source expansion interface of the webpage may include: adding the fragmented media file, by the player, to a media source object in the MSE interface; calling the MSE to create a virtual address corresponding to the media source object; and delivering the virtual address to the media element of the webpage, wherein the virtual address is used for playing the media element by taking the media source object as a data source. The media element can be a video element and/or an audio element of a webpage, and the media element acquires a media source object through a virtual address for playing.

Figure 9:
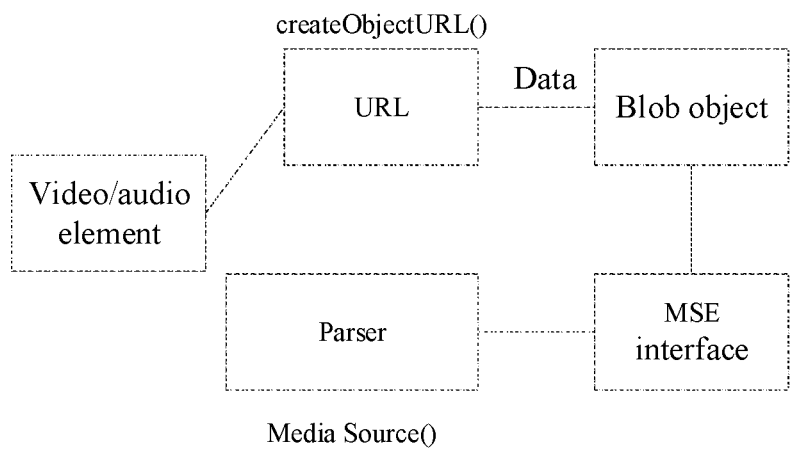
FIG. 9 is an optional schematic diagram of a player playing a fragmented media file through a media source expansion interface of a webpage provided by an embodiment of the disclosure.

With reference to FIG. 9, which an optional schematic diagram of a player playing a fragmented media file through a media source expansion interface of a webpage provided by an embodiment of the disclosure; when the player receives a playing event of the media file in a playing window in the webpage (corresponding to the playing window of the player), the player creates a media source object by executing a MediaSource method through MSE, creates a cache of the MediaSource object, namely a SourceBuffer object, by executing an addSourceBuffer method packaged in a media source expansion interface, wherein one MediaSource object has one or more SourceBuffer objects, and each SourceBuffer object can correspond to a playing window in the webpage and is used for receiving a fragmented media file to be played in the window.

In the playing process of the media file, a parser (Parser) in the player continuously constructs a new fragmented media file by parsing newly acquired media data, and adds the fragmented media file to the SourceBuffer object of the same MediaSource object by executing an appendBuffer method of the SourceBuffer object.

And after the player adds the constructed fragmented media file to the media source object in the media resource expansion interface, the media resource expansion interface is called to create a virtual address corresponding to the media source object. For example, the player executes a createObjectURL method packaged in the media source extension interface, creates a virtual address corresponding to the media source object, i.e., a virtual Uniform Resource Locator (URL), in which a fragmented media file of the Blob type is packaged.

In addition, the player sets the MediaSource object as the source (src) attribute of the virtual URL, that is, binds the virtual URL to a media element in the webpage, such as a video/audio element, this process is also referred to as associating the media source object to the media element in the webpage.

In an embodiment of the disclosure, the fragmented media file added to the media source object is currently played fragmented media file. For example, currently the fragmented media file 1 is playing, subsequent fragmented media files 2, 3 have been constructed, and then the constructed fragmented media files 2, 3 will be added to the Source Buffer of the MSE for preloading, and accordingly, the first key frame of the two key frames corresponding to the media data acquired by the player is the first key frame occurring after the fragmented media file 1.

For a virtual address transmitted by a player to a media element of a webpage, the player includes a statement for calling the media element to play a virtual URL, for example: <audio> virtual URL. When the webpage interprets the corresponding statement in the player embedded in the webpage, the media element of the webpage is enabled to read the fragmented media file from the SourceBuffer object bound with the virtual URL, and the fragmented media file is decoded and played.

The process of converting the MP4 file into the FMP4 file by the player and playing the FMP4 file in the webpage through the media source extension interface will be described below.

Figure 10:
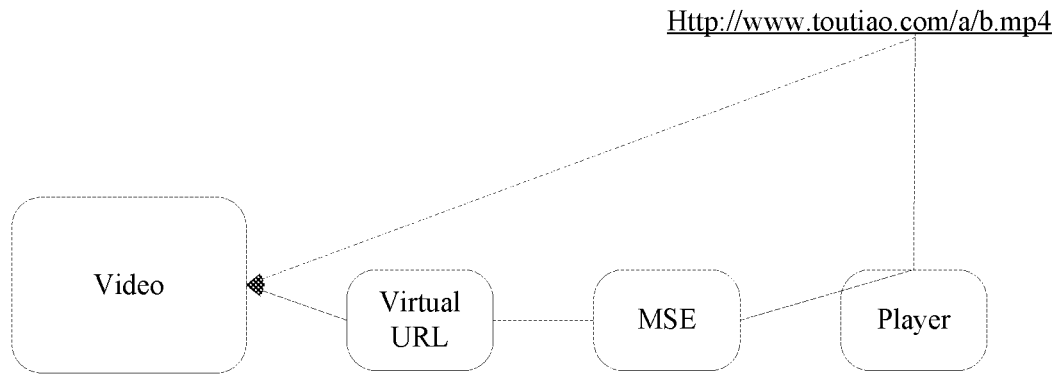
FIG. 10 is a schematic diagram of an MP4 file converted to an FMP4 File and played through a media source expansion interface provided by an embodiment of the disclosure.

With reference to FIG. 10, which is a schematic diagram of an MP4 file converted to an FMP4 file and played through a media source expansion interface provided by an embodiment of the disclosure, a player requests, on the basis of a real address (http://www.touitao.com/a/b.mp4), to acquire part of the media data in the MP4 file from the server, e.g., data having decoding time within the given period in succession with a playing point.

The player constructs an FMP4 file on the basis of the acquired media data, and then adds the FMP4 file to the SourceBuffer object corresponding to the MediaSource object. As the virtual URL is bound to the MediaSource object, when the codes allowing the player to call the audio/video element are executed, the audio/video element reads the continuously added new FMP4 file from the SourceBuffer object of the MediaSource object and decodes to realize continuous playing of the media file. The media element of the webpage acquires the media source object on the basis of the virtual URL so as to play the media file instead of acquiring the media data on the basis of the real address of the media file, thereby realizing the protection of the real address of the media file.

Figure 11:
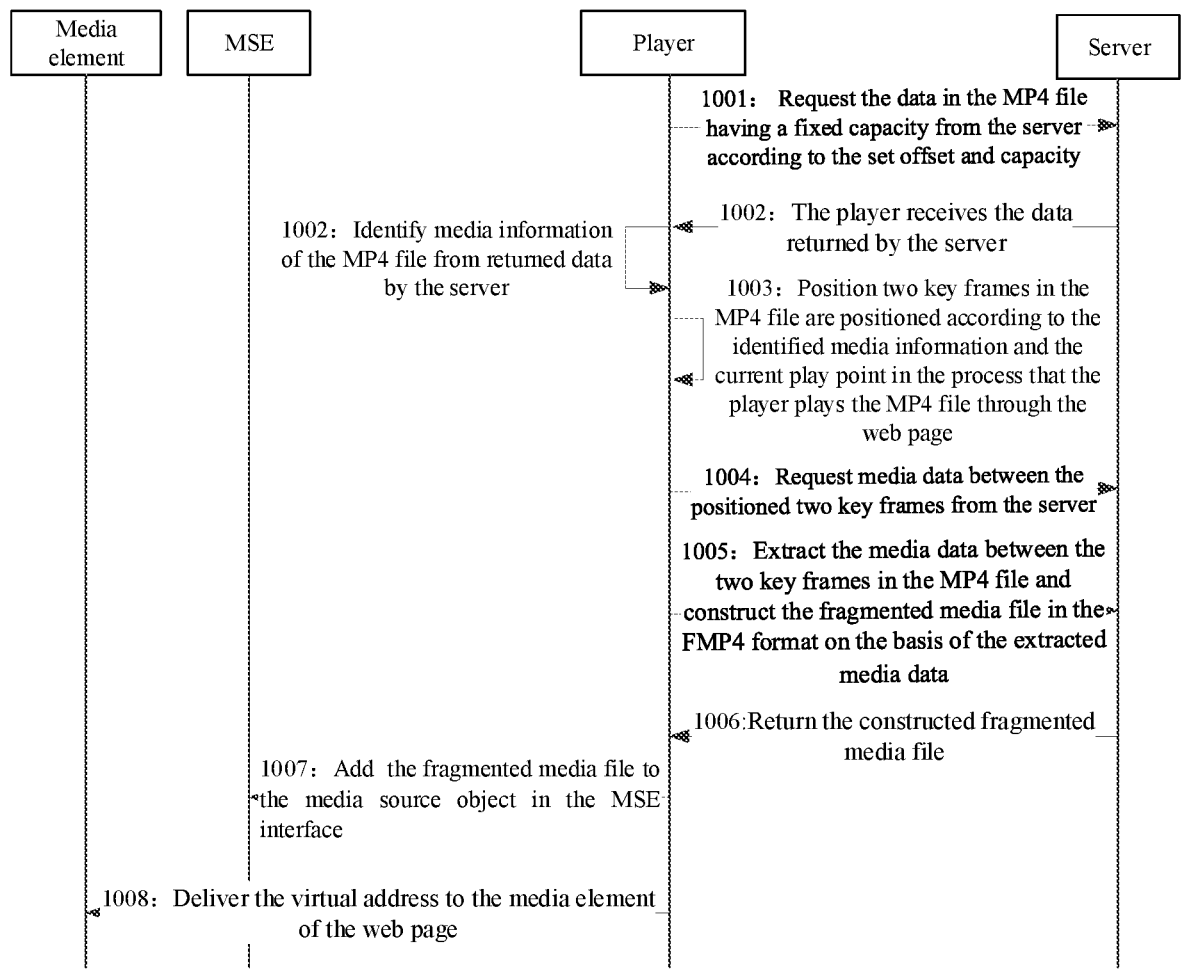
FIG. 11 is a schematic diagram of an optional process of a play control method provided by an embodiment of the disclosure.

Next, taking the player embedded in the webpage and the player playing the MP4 file using the HTML5 Video element+audio element of the webpage as an example, the playing control method of the disclosed embodiment is described, and according to the implementation of MP4, the method can be easily applied to other non-streaming media formats. FIG. 11 illustrates a schematic diagram of an optional process of a play control method provided by an embodiment of the disclosure. With reference to FIG. 11, the play control method provided by an embodiment of the disclosure includes the following steps:

At step 1101: the player requests the data, file having a fixed capacity, in the MP4 from the server according to the set offset and capacity.

The player sends a data request carrying the set offset and capacity to the server so as to acquire binary data starting from zero bytes in the MP4 file and conforming to the set capacity. Taking the packaging structure of the MP4 file including sequentially packaged fytp box, moov box and mdat box as an example, the set capacity can be acquired through statistics according to the ftyp box and moov box capacity of the existing MP4 file, so that the set capacity can cover the sum of the ftyp box and moov box of a set proportion (e.g., all) of the MP4 file, thereby ensuring that complete moov box binary data can be requested from a server for once. If the moov data are not acquired completely through once request, the offset and the capacity are recalculated, and then a second request is carried out.

At step 1102: the player receives the data returned by the server and identifies the media information of the MP4 file from the data returned by the server.

The media information of the MP4 file includes information such as offset, capacity, decoding time of video/audio frames in the MP4 file.

In some embodiments, the player may enable identification of media information for the MP4 file by: identifying binary data of the fytp box from the data returned by the server, and reading the type and the capacity of the container from the rest binary data; when the type of the read container is a moov box, and the capacity of the rest binary data is not less than the capacity of the moov box, the media information is parsed out from the rest binary data. Herein, the starting section of the binary data returned by the server must correspond to the ftyp box, and according to the packaging specification of the ftyp box, the capacity (i.e., length) of the ftyp box and the capacity of the complete MP4 file can be read; for example, given that the capacity of the ftyp box is a (in bytes), the header information of the subsequent container is read starting from a+1 to acquire the type and capacity of the subsequent container, and if the ftyp box is followed by the moov box acquired by reading, and the capacity of the rest binary data (the set capacity minus the capacity of the ftyp box) is larger than the capacity of the moov box, it's proven that the complete binary data of the moov box has been retrieved, the binary data can be parsed according to the packaging structure, and the media information can be restored.

In some embodiments, when the binary data returned by the server do not include complete moov data, the capacity of the container is read from the acquired binary data to determine the offset and the capacity of the moov box in the MP4 file; when the type of the container read from the rest binary data is moov box and the capacity of the rest binary data is not less than the capacity of the moov box, the moov data starting with the offset of the moov box in the MP4 file and conforming to the capacity of the moov box in the MP4 file is acquired from the server according to the determined offset and capacity; when the type of the container read from the rest binary data is moov box, and the capacity of the rest binary data is less than the capacity of the moov box, the difference between the capacity of the moov box and the capacity of the rest binary data is calculated as a new capacity for a second request, and the sum of the offset and the capacity for the first request is taken as a new offset, on this basis, the second request for binary data is sent to the server.

In practical disclosure, it possible that the packaging structure of the MP4 file is sequentially packaged fytp box, moov box and mdat box, when the type of the container read from the rest binary data is the mdat box, the sum of the capacity of the mdat box and the capacity of the moov box is calculated as a new offset of a second request, and a set capacity is taken, on this basis, the second request for the binary data is sent to the server.

At step 1103: in the process that the player plays the MP4 file through the webpage, two key frames in the MP4 file are positioned according to the identified media information and the current playing point.

In an embodiment of the disclosure, the player plays the media data (at least including video data and further including audio data) between the two key frames as a loading unit, that is, the player plays the MP4 file by loading the media data between the two key frames, and it is possible that only common frames exist between the two key frames, namely, the two key frames are adjacent key frames; and it is also possible that other key frames exist between the two key frames.

Taking a case where a playing point is reached by jumping in an MP4 file as an example to describe, the player positions a first key frame decoded before the playing point in the MP4 file as the first key frame, and positions the key frames decoded later than the first key frame in the MP4 file as the second key frame. Herein, the video frame of the media file corresponding to the playing point can be both the common frame and the key frame, and when the video frame corresponding to the playing point is just the key frame, the first key frame in the MP4 file whose decoding time precedes the playing point is the key frame corresponding to the playing point, that is, the first key frame in the media data requested by the player is the key frame corresponding to the playing point.

Positioning the two key frames in the MP4 file by the player includes: determining the offset and the capacity of the first key frame and the second key frame on the basis of the identified media information and the current playing point, and further requesting media data between the first key frame and the second key frame from the server on the basis of the offset and the capacity.

At step 1104: media data between the positioned two key frames is requested from the server.

In actual implementation, a player sends a network request to a server to request media data between two key frames positioned in an MP4 file, wherein the network request carries offset and capacity of a target interval corresponding to the two key frames.

Herein, the player positions the video frame in the mdat according to the offset and the capacity of the video frame in the MP4 file between the first key frame and the second key frame, positions the audio frame in the mdat according to the offset and the capacity of the audio frame aligned with the video frame in the MP4 file, an interval formed by an upper limit and a lower limit of the position, wherein the offset and the capacity corresponding to the upper limit of the position are the offset and the capacity corresponding to the upper limit of the target interval, and the offset and the capacity corresponding to the lower limit of the position are the offset and the capacity corresponding to the lower limit of the target interval.

For example, the period of the media file is 120 seconds, a plurality of key frames are included in the media file, when the given period is 00:00:20 to 00:00:40, according to the mapping relation between the decoding time of the frame and the sequence number of the frame, the first search is directed to whether there is a key frame with the decoding time just at 00:00:20 or not, and if there is such a key frame, the key frame with the decoding time just at 00:00:20 serves as the first key frame; if not, the search is directed to find a key frame having the decoding time earlier than 00:00:20 and closest to the start time 00:00:20 as the first key frame.

Secondly, the search is directed to whether there is a key frame having the decoding time just at 00:00:40 or not, and if the is such a frame, the key frame with the decoding time just at 00:00:40 is taken as the second key frame; if not, the search is directed to find a key frame having the decoding time later than 00:00:40 and closest to 00:00:40 as the second key frame.

According to the method for searching the key frames in the video frames, frame skipping due to the failure to play caused by the fact that the start time corresponds to a common frame can be avoided, moreover, the acquisition of useless data is reduced to the minimum extent, and the traffic is saved during network transmission.

At step 1105: the server extracts the media data between the two key frames in the MP4 file and constructs the fragmented media file in the FMP4 format on the basis of the extracted media data.

In actual implementation, the server calculates the fragmented media file level metadata according to the media information of the media data, and then fills the fragmented media file level metadata and the media data according to the packaging format of the fragmented media file in the FMP4 format to acquire the fragmented media file in the FMP4 format.

At step 1106: the constructed fragmented media file is returned to the player.

The server realizes the conversion from the MP4 format file to the FMP4 format fragmented media file, the fragmented media file is delivered to the front-end player, the front-end player does not need to convert, and thus has a small playing load, the hardware capability of the terminal is not limited, and the endurance of the terminal is guaranteed.

At step 1107: the player adds the fragmented media file to the media source object in the MSE interface.

At step 1108: the player delivers the virtual address to the media element of the webpage.

The virtual address is used for the media element (video element+audio element) to play a video by taking the media source object as a data source.

In summary, the embodiments of the disclosure have the following beneficial effects:

1) By converting media data in a media file in a non-streaming media format into a fragmented media file and sending the fragmented media file to a media element of a webpage for decoding and playing through a media source expansion interface of the webpage, the object of playing the media file in the non-streaming media format through the webpage is achieved, overcoming the limitation that the non-streaming media packaged format file can only be independently played after being completely downloaded, and simultaneously realizing efficient playing of the MPEG-4 format media file with small storage space occupation.

2) In the playing process of the player embedded in the webpage, when the resolution ratio is switched, pictures can be switched seamlessly, a black screen is avoided, without affecting normal use of a user.

Figure 12:
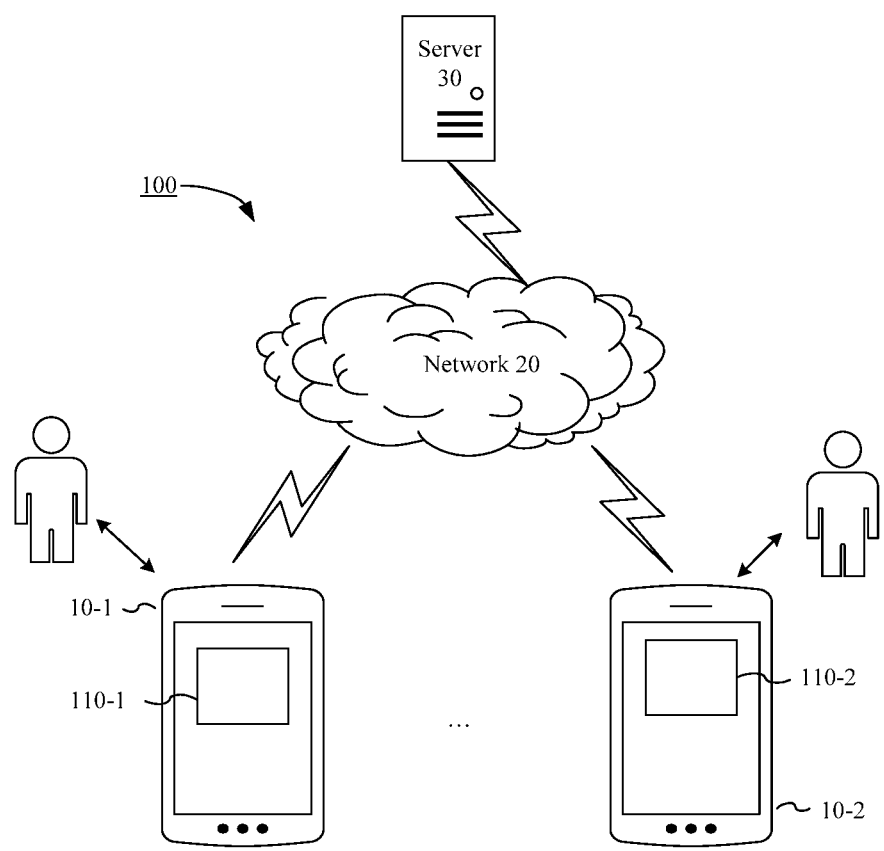
FIG. 12 is a schematic diagram of an optional use scenario of a method for playing a media file in a webpage while switching resolution provided by an embodiment of the disclosure.

FIG. 12 is a schematic diagram of an optional use scenario of a method for playing a media file in a webpage while switching resolution provided by an embodiment of the disclosure. With reference to FIG. 12, the device for playing media files in a webpage while switching resolution is implemented as a user terminal 10. In order to support in an exemplary case of disclosure, the user terminal 10 (the user terminal 10-1 and the user terminal 10-2 are shown for illustration) is connected to a server 30 via a network 20. The network 20 may be a wide area network or a local area network, or a combination of both, using wireless links for data transmission.

The user terminal 10 plays a media file through a webpage having an embedded player, displays the played content through a graphic interface 110 (a graphic interface 110-1 and a graphic interface 110-2 are shown as examples), and in the playing process, receives a resolution switching event when the player embedded in the webpage plays an original resolution media file acquired from the server 30; in response to the resolution switching event, media data in a target resolution media file to be switched to are requested; the original resolution media file and the target resolution media file adopt non-streaming media packaging formats; a fragmented media file for independent decoding is constructed on the basis of the requested media data; and the fragmented media file is sent to a media element of the webpage through a media source expansion interface of the webpage, wherein the fragmented media file is used for playing the media element in succession with the playing point where the resolution switching event occurs.

While the foregoing is directed to the preferred embodiments of the disclosure, it is not intended to limit the scope of the disclosure, but on the contrary, it is intended to cover all modifications, equivalents, and alternatives which shall fall within the scope of the disclosure.

The invention claimed is:

1. A method for playing a media file while switching resolution in a webpage, comprising:
   receiving a resolution switching event when a player embedded in the webpage plays a media file with original resolution;
   requesting media data of a media file with target resolution to be switched in response to the resolution switching event;
   wherein the media file with original resolution and the media file with target resolution adopt a non-streaming media packaging format;
   constructing a fragmented media file for independently decoding based on the requested media data; and
   sending the fragmented media file to a media element of the webpage through a media source expansion interface of the webpage; wherein the fragmented media file is used for providing the media element to play in succession with a playing point where the resolution switching event occurs.

2. The method according to claim 1, wherein the requesting media data of a media file with target resolution to be switched in response to the resolution switching event comprises:
   determining two key frames in the media file with target resolution based on time of a video frame represented by media information of the media file with target resolution;
   wherein decoding time of the two key frames is endpoint time of a given period, and the given period is used for continuing the playing point of the media file with original resolution;
   requesting the media data in the media file with target resolution based on a location of the media data represented by the media information in the media file with target resolution; wherein the decoding time of the requested media data is within the given period.

3. The method according to claim 2, wherein the given period is shorter than or equal to a preloading period, and the preloading period is shorter than playing time of the media file with target resolution.

4. The method according to claim 3, wherein the method further comprises:
   when the resolution switching event is received, continuing playing based on a fragmented media file with original resolution until completing to construct the fragmented media file with target resolution that is sent to the media element of the webpage through the media source expansion interface.

5. The method according to claim 2, wherein the method further comprises:
   when the resolution switching event is received, continuing playing based on a fragmented media file with original resolution until completing to construct the fragmented media file with target resolution that is sent to the media element of the webpage through the media source expansion interface.

6. The method according to claim 1, wherein the constructing a fragmented media file for independently decoding based on the requested media data comprises:
   calculating metadata corresponding to the media data; wherein the calculated metadata carry media information for supporting to decode the media data; and
   filling the calculated metadata and media data between the two key frames into a packaging structure of the fragmented media file to acquire a corresponding fragmented media file.

7. The method according to claim 6, wherein the method further comprises:
   when the resolution switching event is received, continuing playing based on a fragmented media file with original resolution until completing to construct the fragmented media file with target resolution that is sent to the media element of the webpage through the media source expansion interface.

8. The method according to claim 1, wherein the sending the fragmented media file to a media element of the webpage through a media source expansion interface of the webpage comprises:
   adding the constructed fragmented media file to a media source object in the media source expansion interface;
   creating a virtual address corresponding to the media source object; and
   transmitting the virtual address to the media element of the webpage, wherein the virtual address is used for supporting the media element to play by taking the media source object as a data source.

9. The method according to claim 8, wherein the method further comprises:
   when the resolution switching event is received, continuing playing based on a fragmented media file with original resolution until completing to construct the fragmented media file with target resolution that is sent to the media element of the webpage through the media source expansion interface.

10. The method according to claim 1, wherein the method further comprises:
    when the resolution switching event is received, continuing playing based on a fragmented media file with original resolution until completing to construct the fragmented media file with target resolution that is sent to the media element of the webpage through the media source expansion interface.

11. A device for playing a media file while switching resolution in a webpage, wherein the device comprises:
    at least one processor; and at least one memory communicatively coupled to the at least one processor and storing instructions that upon execution by the at least one processor cause the device to:
receive a resolution switching event when a player embedded in the webpage plays a media file with original resolution;
request media data of a media file with target resolution to be switched in response to the resolution switching event;
construct a fragmented media file for independently decoding based on the requested media data; and
send the fragmented media file to a media element of the webpage through a media source expansion interface of the webpage; wherein the fragmented media file is used for providing the media element to play in succession with a playing point where the resolution switching event occurs.

12. The device according to claim 11, wherein the at least one memory further stores instructions that upon execution by the at least one processor cause the device system to determine two key frames in the media file with target resolution based on time of a video frame represented by media information of the media file with target resolution;
wherein decoding time of the two key frames is endpoint time of a given period, and the given period is used for continuing the playing point of the media file with original resolution;
wherein the at least one memory further stores instructions that upon execution by the at least one processor cause the device system to request the media data in the media file with target resolution based on a location of the media data represented by the media information in the media file with target resolution; wherein the decoding time of the requested media data is within the given period.

13. The device according to claim 12, wherein the given period is shorter than or equal to a preloading period, and the preloading period is shorter than playing time of the media file with target resolution.

14. The device according to claim 13, wherein the device further comprises:
at least one memory further stores instructions that upon execution by the at least one processor cause the device system to continue playing based on a fragmented media file with original resolution when the resolution switching event is received, until the fragment construction module completes to construct the fragmented media file with target resolution that is sent to the media element of the webpage through the media source expansion interface.

15. The device according to claim 12, wherein the device further comprises:
at least one memory further stores instructions that upon execution by the at least one processor cause the device system to continue playing based on a fragmented media file with original resolution when the resolution switching event is received, until the fragment construction module completes to construct the fragmented media file with target resolution that is sent to the media element of the webpage through the media source expansion interface.

16. The device according to claim 11, wherein the at least one memory further stores instructions that upon execution by the at least one processor cause the device system to calculate metadata corresponding to the media data; wherein the calculated metadata carry media information for supporting to decode the media data;
wherein the at least one memory further stores instructions that upon execution by the at least one processor cause the device system to fill the calculated metadata and the media data between the two key frames into a packaging structure of the fragmented media file to acquire a corresponding fragmented media file.

17. The device according to claim 16, wherein the device further comprises:
at least one memory further stores instructions that upon execution by the at least one processor cause the device system to continue playing based on a fragmented media file with original resolution when the resolution switching event is received, until the fragment construction module completes to construct the fragmented media file with target resolution that is sent to the media element of the webpage through the media source expansion interface.

18. The device according to claim 11, wherein the at least one memory further stores instructions that upon execution by the at least one processor cause the device system to add the constructed fragmented media file to a media source object in the media source expansion interface;
wherein the at least one memory further stores instructions that upon execution by the at least one processor cause the device system to create a virtual address corresponding to the media source object;
wherein the at least one memory further stores instructions that upon execution by the at least one processor cause the device system to transmit the virtual address to the media element of the webpage, wherein the virtual address is used for supporting the media element to play by taking the media source object as a data source.

19. The device according to claim 11, wherein the device further comprises:
at least one memory further stores instructions that upon execution by the at least one processor cause the device system to continue playing based on a fragmented media file with original resolution when the resolution switching event is received, until the fragment construction module completes to construct the fragmented media file with target resolution that is sent to the media element of the webpage through the media source expansion interface.

20. A storage medium, wherein an executable instruction is stored, and when the executable instruction is executed, the storage medium performing operations comprising:
receiving a resolution switching event when a player embedded in the webpage plays a media file with original resolution;
requesting media data of a media file with target resolution to be switched in response to the resolution switching event;
wherein the media file with original resolution and the media file with target resolution adopt a non-streaming media packaging format;
constructing a fragmented media file for independently decoding based on the requested media data; and
sending the fragmented media file to a media element of the webpage through a media source expansion interface of the webpage; wherein the fragmented media file is used for providing the media element to play in succession with a playing point where the resolution switching event occurs.

* * * * *